United States Patent
Blyler, Jr. et al.

(10) Patent No.: US 6,265,018 B1
(45) Date of Patent: Jul. 24, 2001

(54) FABRICATING GRADED INDEX PLASTIC OPTICAL FIBERS

(75) Inventors: Lee L. Blyler, Jr., Basking Ridge, NJ (US); Gary J. Grimes, Birmingham, AL (US); Charles J. Sherman, Westminster, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/387,607

(22) Filed: Aug. 31, 1999

(51) Int. Cl.[7] .................. C03B 37/07; G01N 21/84; G01N 21/958; G02B 6/18; B05D 5/06
(52) U.S. Cl. .................. 427/8; 427/9; 427/10; 427/163.2; 427/164; 65/377; 65/378
(58) Field of Search .................. 427/8, 9, 10, 163.2, 427/164, 420, 240; 65/377, 378

(56) References Cited

U.S. PATENT DOCUMENTS

| | | | |
|---|---|---|---|
| 4,620,861 | * 11/1986 | Berkey | 65/399 |
| 5,381,503 | * 1/1995 | Kanamori et al. | 385/123 |
| 5,593,621 | * 1/1997 | Koike et al. | 264/1.29 |
| 5,614,253 | * 3/1997 | Nonaka et al. | 427/163.2 |
| 5,756,165 | * 5/1998 | Ali et al. | 427/513 |
| 5,760,139 | 6/1998 | Koike et al. | 525/200 |
| 5,783,636 | 7/1998 | Koike et al. | 525/199 |
| 6,069,718 | * 5/2000 | Khaleghi | 359/110 |
| 6,109,064 | * 8/2000 | King | 65/378 |

* cited by examiner

Primary Examiner—Shrive Beck
Assistant Examiner—Michael Cleveland

(57) ABSTRACT

Fabricating graded index plastic optical fiber by diffusing a high molecular weight dopant within a step index plastic optical fiber after the step index plastic optical fiber has been drawn from a preform using a conventional draw tower in a first embodiment. Also, the step index plastic optical fiber may be fabricated by extruding one material circumferentially around another material, e.g., by use of a concentric nozzle. The dopant is diffused after the drawing or extruding of the step index plastic optical fiber by heating the plastic optical fiber to a temperature that causes a high rate of diffusion state while measuring the transmission bandwidth of the plastic optical fiber. When the predetermined specified transmission bandwidth is measured, the plastic optical fiber is immediately returned to an ambient temperature. In addition, the plastic optical fiber may be gradually heated to an equilibrium temperature that is just below the temperature required to produce the high rate of diffusion state. Once the equilibrium temperature has been achieved, additional heating is carried out to raise the temperature to that required to produce the high rate of diffusion and the transmission bandwidth is tested.

7 Claims, 3 Drawing Sheets

FABRICATING GRADED INDEX PLASTIC OPTICAL FIBERS

TECHNICAL FIELD

This invention relates to the fabrication of optical fiber.

BACKGROUND OF THE INVENTION

In the prior art, fabrication of a graded-refractive-index optical fiber is well known. For example, U.S. Pat. No. 5,760,139 and U.S. Pat. No. 5,783,636 disclose seven methods for fabricating a graded-refractive-index optical fiber. In such an optical fiber, a dopant is so distributed in a fluoropolymer as to have a concentration gradient in the direction from the center to the periphery. Preferably, it is an optical fiber wherein the dopant is a material having a higher refractive index than the fluoropolymer, and the dopant is so distributed as to have a concentration gradient such that the concentration of the dopant decreases in the direction from the center of the optical fiber to the periphery. Hence, a graded refractive index optical fiber is produced by arranging the dopant at the center and diffusing the dopant toward the periphery. In other cases, a graded refractive index optical fiber is formed wherein the dopant is a material having a lower refractive index than the fluoropolymer, and the dopant is so distributed as to have a concentration gradient that the concentration of the dopant decreases in the direction from the periphery of the optical fibers to the center. Hence, a graded refractive index optical fiber is produced by diffusing the dopant from the periphery toward the center.

The above-referenced patents disclose the following seven methods for fabricating graded index plastic optical fiber. A first method comprises melting the fluoropolymer, injecting the dopant or a fluoropolymer containing the dopant at the center of the melt of the fluoropolymer, and then molding the melt while or after diffusing the dopant. In this case, the dopant may be injected at the center not only so as to form only one layer but also so as to form multiple layers. The molding is carried out by melt-extrusion, which is suitable for forming a rod-like body material such as a preform of an optical fiber, or by melt-spinning, which is suitable for forming an optical fiber.

A second method comprises dip-coating the dopant or the fluoropolymer containing the dopant on a core formed from the fluoropolymer by melt spinning or drawing.

A third method comprises forming a hollow tube of the fluoropolymer by using a rotating glass tube or the like, filling in the polymer tube with a monomer phase which gives the dopant or the fluoropolymer which contains the dopant, and then polymerizing the monomer phase while rotating the polymer tube at a low speed. In the case of interfacial gel polymerization, at the polymerization step, the tube of the fluoropolymer swells up in the monomer phase and forms a gel phase, and the monomer molecules are polymerized while preferentially diffusing in the gel phase.

A fourth method wherein two kinds of monomers with different reactivities are used, one of which is a monomer which forms the fluoropolymer, and the other is a monomer which forms the dopant, are used, and the polymerization reaction is carried out so that the compositional proportion of the resulting fluoropolymer to the resulting dopant varies continuously in the direction from the periphery to the center.

A fifth method comprises hot-drawing or melt-extruding a mixture of the fluoropolymer and the dopant obtained by homogeneously mixing them or by homogeneously mixing them in a solvent and then removing the solvent by means of evaporation, into fibers, and then (or immediately after the formation of the fibers) bringing the fibers into contact with an inert gas under heating to evaporate the dopant from the surface and thereby forming a graded refractive index. Alternatively, the fibers are immersed in a solvent which does not dissolve the fluoropolymer but dissolves the dopant so as to dissolve out the dopant from the surface of the fibers so that a graded refractive index is formed.

A sixth method comprises coating a rod or a fiber of the fluoropolymer with only the dopant which has a smaller refractive index than the fluoropolymer or with a mixture of the fluoropolymer and the dopant, and then diffusing the dopant by heating to form a graded refractive index.

A seventh method comprises mixing a high-refractive-index polymer and a low-refractive-index polymer by hot-melting or in a state of a solution containing a solvent, and diffusing them in each other while (or after) multilayer-excluding in a state that each has a different mixing ratio, to eventually obtain a fiber having a graded refractive index. In this case, the high-refractive-index polymer may be the fluoropolymer, and the low-refractive-index polymer may be the dopant.

In all of the above fabrication methods, optical transmission bandwidth is determined by a post-manufacturing test step after the cladding and buffer have been added to the fabricated core of the optical fiber and all diffusion processes are completed. If the transmission bandwidth does not meet the required specifications, the optical fiber must be discarded. This represents a significant problem in the prior art method of fabricating plastic optical fiber.

SUMMARY OF THE INVENTION

A departure in the art is achieved by a method for fabricating graded index plastic optical fiber by diffusing a high molecular weight dopant within a step index plastic optical fiber after the step index plastic optical fiber has been drawn from a preform. The step index plastic optical fiber may be fabricated by extruding one material circumferentially around another material, e.g., by use of a concentric nozzle. The dopant is diffused after the drawing or extruding of the step index plastic optical fiber by heating the plastic optical fiber to a temperature that causes a high rate of diffusion state while measuring the transmission bandwidth of the plastic optical fiber. When the predetermined specified transmission bandwidth is reached, the plastic optical fiber is immediately returned to an ambient temperature. Advantageously, the plastic optical fiber is gradually heated to an equilibrium temperature that is just below the temperature required to produce the high rate of diffusion state. Once the equilibrium temperature has been achieved, additional heating is carried out to raise the temperature to that required to produce the high rate of diffusion and the transmission bandwidth is tested. The diffusion continues until the specified transmission bandwidth is reached. Also, when the plastic optical fiber is initially drawn from the preform, or is initially formed by extrusion, the resulting core and outer cladding are covered with a buffer material that will remain substantially undistorted at the temperature required for a high rate of diffusion.

In a second embodiment of the invention, the preform is initially heated for an amount of time that will allow the diffusion process to be partially completed. After the plastic optical fiber has been drawn, diffusion is completed while testing for the specified transmission bandwidth. The plastic optical fiber is returned to the ambient temperature when the specified transmission bandwidth is achieved.

Other and further aspects of the present invention will become apparent during the course of the following description and by reference to the accompanying drawing.

DETAILED DESCRIPTION

Figure 1:
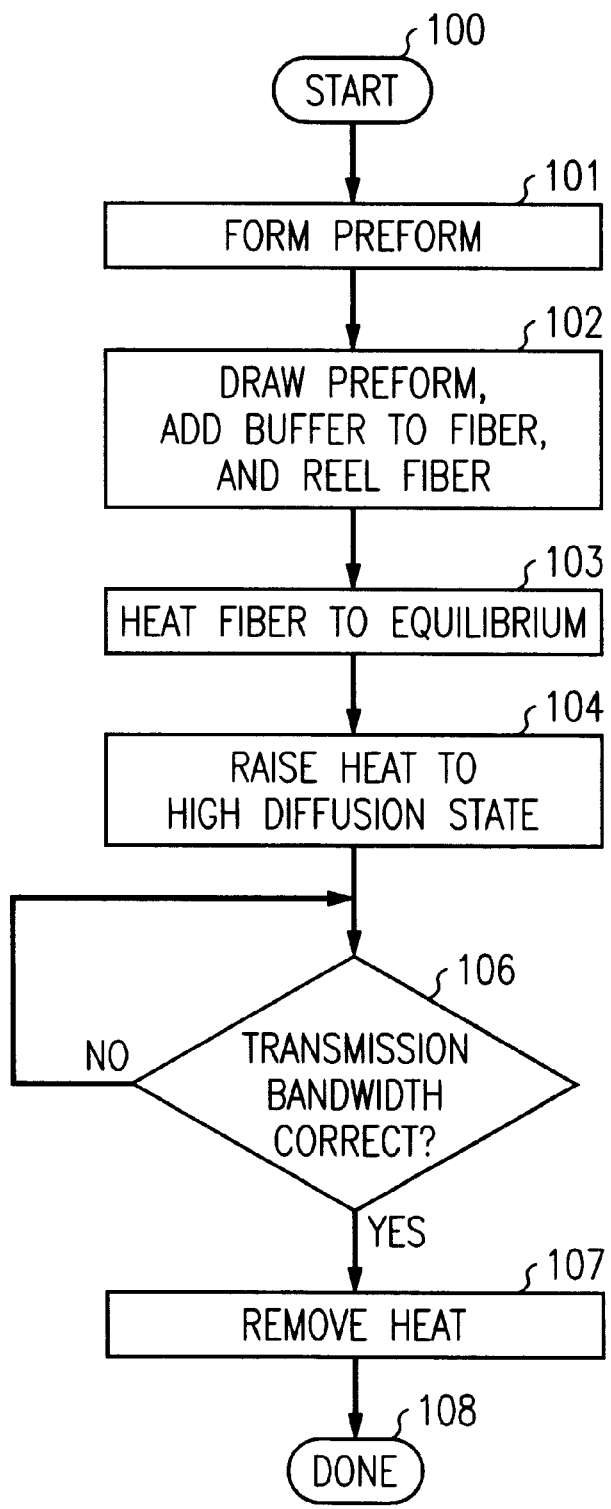
FIG. 1 illustrates, in flowchart form, steps for fabricating plastic optical fiber in accordance with a first embodiment of the invention.

FIG. 1 illustrates the steps for fabricating plastic optical fiber in accordance with the first embodiment. After starting in block 100, block 101 forms the preform with the dopant. Next, block 102 draws the preform to the proper diameter for a step index plastic optical fiber, adds the buffer material to the step index plastic optical fiber, and places the is step index plastic optical fiber on a reel. In block 103, the reel of step index optical fiber is placed in an oven at ambient temperature, the oven is then heated until the optical fiber reaches an equilibrium temperature which is slightly less than the temperature required to place the step index plastic optical fiber in the high rate of diffusion state that causes a graded index plastic optical fiber to be formed. Next, block 104 causes the temperature of the oven to be raised to the temperature required for the high rate of diffusion and transfers control to decision block 106. In decision block 106, the transmission bandwidth is measured to determine if the necessary bandwidth has been achieved, if the answer is no, the bandwidth continues to be measured until it reaches the specified level. Once the transmission bandwidth is correct, control is transferred to block 107 where the graded index optical fiber is returned to the ambient temperature either by removing the reel of optical fiber from the oven or rapidly decreasing the temperature of the oven. After completion of block 107, control is transferred to block 108 which is the termination of the fabrication process. One skilled in the art can readily envision that the step index plastic optical fiber is not placed on a reel before heating but rather that the resulting graded plastic optical fiber is placed on a reel. If the step index plastic optical fiber is formed by extrusion rather than drawn from a preform, steps of blocks 101 and 102 are combined into a step of extruding and reeling the step index plastic optical fiber.

The buffer material which covers the cladding and the core of the optical fiber may advantageously be a thermoplastic polymer having a high melting temperature or glass transition temperature, above the temperature at which the dopant diffusion process is carried out. The thermoplastic buffer may be applied to optical fiber during, or subsequent to, the drawing process. Suitable processes for applying the thermoplastic buffer include melt extrusion or drawing from a melted tube which surrounds the preform or fiber. Alternatively buffer material may be a crosslinked polymer which is applied to the drawn optical fiber in a liquid prepolymer state, and solidified using thermal, UV or electron beam activation to initiate a rapid crosslinking polymerization reaction. Because such a buffer possesses a permanent network structure, it retains its shape even when heated above its glass transition temperature. Therefore, it has little tendency to cause distortion of the fiber when it is softened at the temperature required for a high rate of diffusion. Examples of suitable thermoplastic buffer materials are nylon, polyetherimide, polysulfone, copolymers of tetrafluoroethylene and hexafluoropropylene and amorphous fluoropolymers. Examples of crosslinked buffer materials are silicone elastomers, urethane acrylate polymers, epoxy resins, epoxy acrylate polymers and urethane elastomers.

Figure 2:
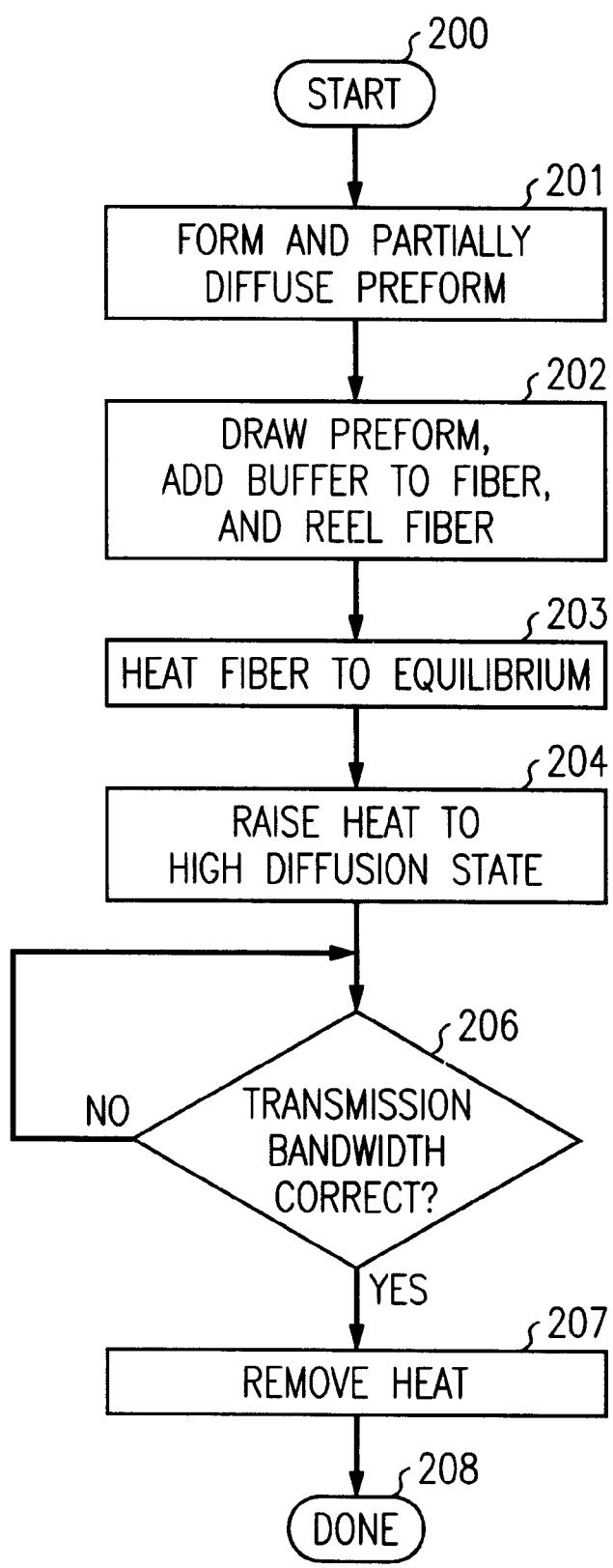
FIG. 2 illustrates, in flowchart form, steps for fabricating plastic optical fiber in accordance with a second embodiment of the invention.

FIG. 2 illustrates the steps for fabricating plastic optical fiber in accordance with the second embodiment. After starting in block 200, block 201 forms the preform with the dopant. Addition, block 201 partially diffuses the dopant for a predetermined amount of time. Next, block 202 draws the preform to the proper diameter for the plastic optical fiber, adds the buffer material to the optical fiber, and places the optical fiber on a reel. In block 203, the reel of optical fiber is placed in an oven at ambient temperature, the oven is then heated until the optical fiber reaches an equilibrium temperature which is slightly less than the temperature required to place the optical fiber in the high rate of diffusion state. Next, block 204 causes the temperature of the oven to be raised to the temperature required for the high rate of diffusion and transfers control to decision block 206. In decision block 206, the transmission bandwidth is measured to determine if the necessary bandwidth has been achieved, if the answer is no, the bandwidth continues to be measured until it reaches the specified level. Once the transmission bandwidth is correct, control is transferred to block 207 whereby the optical fiber is returned to the ambient temperature either by removing the reel of optical fiber from the oven or rapidly decreasing the temperature of the oven. After completion of block 207, control is transferred to block 208 which is the termination of the fabrication process. In the second emodiment of the invention, if extrusion is used to fabricate the initial plastic optical fiber, blocks 201 and 202 are merged into a step of extruding and reeling the initial plastic optical fiber.

Figure 3:
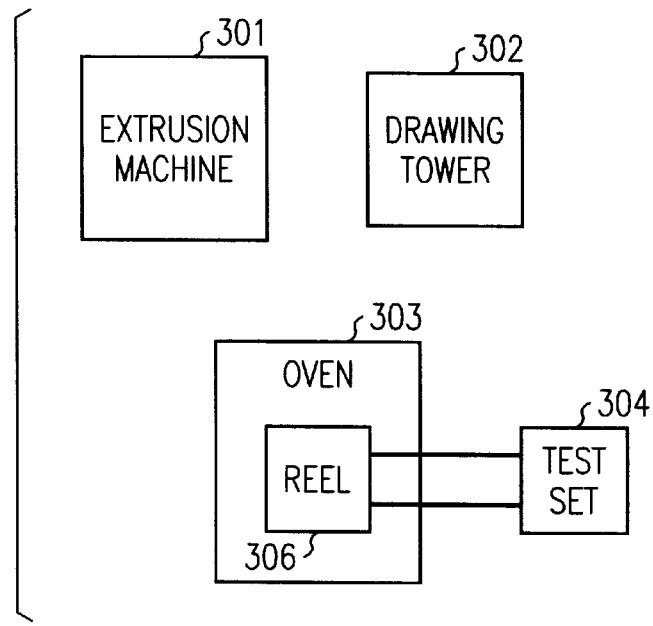
FIG. 3 illustrates, in block diagram form, an apparatus for utilization with the steps of FIGS. 1 and 2.

FIG. 3 illustrates the apparatus necessary for implementing both embodiments when using preforms. Apparatus 301 is utilized to form the preforms, drawing tower 302 is utilized to form the optical fiber from the preform and to enclose the optical fiber in a buffer. After the reel of optical fiber is formed in drawing tower 302, it is placed in oven 303 which may be manually or automatically controlled. If oven 303 is automatically controlled, then the output at test set 304 is used by the automatic controller to determine when to reduce the temperature on reel 306. Test set 304 may be a pulse dispersion test set. Alternatively, test set 304 may be a differential mode delay test set or may be a test set that simply measures the bit error rate of a high-speed optical serial link.

Figure 4:
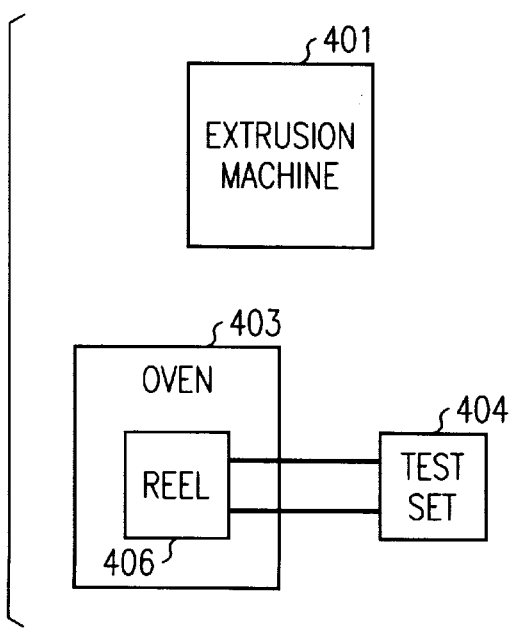
FIG. 4 illustrates, in block diagram form, an apparatus for utilization with the steps of FIGS. 1 and 2.

FIG. 4 illustrates the apparatus necessary for implementing both embodiments when the initial plastic optical fiber is fabricated by extrusion. Apparatus 401 is utilized to extrude the optical fiber, to enclose the optical fiber in a buffer and to form onto reel 406. After the reel of optical fiber is formed in apparatus 401, it is placed in oven 403 which may be manually or automatically controlled. If oven 403 is automatically controlled, then the output at test set 404 is used by the automatic controller to determine when to reduce the temperature on reel 406. Apparatus 401 is disclosed in FIG. 1 of U.S. patent application Ser. No. 09/321050 filed on May 27, 1999 entitled "Process For Fabricating Plastic Optical Fiber", and assigned to the same assignee as the present application. U.S. patent application Ser. No. 09/321050 is hereby incorporated by reference. Apparatus 401 is also disclosed in FIG. 1 of U.S. Pat. No. 5,593,621 which is also incorporated by reference. In the first embodiment of the invention, the step index plastic optical fiber is fabricated by maintaining the temperature in diffusion zone 24 of FIG. 1B of the above-incorporated U.S. Patent Application below the temperature that would cause diffusion to occur, or alternatively by removing diffusion zone 24 from the apparatus. A similar operation would be used with the apparatus disclosed in the above-incorporated U.S. patent. In the second embodiment of the invention, the initial plastic optical fiber is fabricated by maintaining the temperature in diffusion zone 24 of FIG. 1B of the above-incorporated U.S. Patent Application at a temperature that will result in only partial diffusion occurring. A similar operation would be used with the apparatus disclosed in the above-incorporated U.S. patent.

What is claimed is:

1. A method for producing a graded index optical fiber comprising the steps of:

(a) preparing an optical fiber preform, the optical fiber preform comprising a transparent body with a dopant therein, (b) drawing an optical fiber from the preform, (c) reeling the optical fiber on a reel, (d) placing the reel in a furnace, (e) heating the optical fiber to diffuse the dopant and simultaneously measuring an optical characteristic of the optical fiber, thereby producing measurements, and, (f) terminating heating in response to the measurements obtained in step (e).

2. The method of claim 1 wherein the measurements measure transmission bandwidth.

3. The method of claim 2 where the optical fiber preform comprises a core and a cladding, with the core having a dopant;

partially diffusing the dopant within the preform prior to drawing the optical fiber.

4. The method of claim 3 wherein the optical fiber preform has a coating of buffer material that retains its shape during step (e).

5. The method of claim 3 wherein the step of measuring comprises the step of performing a pulse dispersion test.

6. The method of claim 3 wherein the step of measuring comprises the step of performing a differential mode delay test.

7. The method of claim 3 wherein the step of measuring comprises the step of performing a measurement of the bit error rate of the optical fiber.

* * * * *